US012640775B2

(12) United States Patent　　(10) Patent No.:　US 12,640,775 B2

Pettersson et al.　　(45) Date of Patent:　May 26, 2026

(54) NFC-ENABLED CONSTRAINED DEVICE, NFC-ENABLED CONTROL DEVICE, AND METHOD THEREOF

(71) Applicant: Telefonaktiebolaget LM Ericsson (publ), Stockholm (SE)

(72) Inventors: Jonas Pettersson, Luleå (SE); Daniel Bergström, Luleå (SE); Tommy Arngren, Södra Sunderbyn (SE); Till Burkert, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 431 days.

(21) Appl. No.: 17/764,339

(22) PCT Filed: Sep. 30, 2019

(86) PCT No.: PCT/EP2019/076360

§ 371 (c)(1),
(2) Date: Mar. 28, 2022

(87) PCT Pub. No.: WO2021/063469

PCT Pub. Date: Apr. 8, 2021

(65) Prior Publication Data

US 2022/0352927 A1　　Nov. 3, 2022

(51) Int. Cl.
H04B 5/00　　(2024.01)
H02J 7/00　　(2026.01)
(Continued)

(52) U.S. Cl.
CPC ................. H04B 5/79 (2024.01); H04B 5/20 (2024.01); H04B 5/77 (2024.01); H04B 5/45 (2024.01)

(58) Field of Classification Search
None
See application file for complete search history.

(56) References Cited

U.S. PATENT DOCUMENTS 9,178,369 B2 * 11/2015 Partovi ................... H02J 50/80
9,496,732 B2 * 11/2016 Partovi ................... H02J 50/70
(Continued)

FOREIGN PATENT DOCUMENTS

EP　　2347522 A1　　7/2011
EP　　2347522 B1　　12/2014
(Continued)

OTHER PUBLICATIONS

Bormann, C., et al., "Terminology for Constrained-Node Networks", Internet Engineering Task Force (IETF), Request for Comments: 7228, May 2014, pp. 1-17.
(Continued)

*Primary Examiner* — Tuan A Tran
(74) *Attorney, Agent, or Firm* — Murphy, Bilak & Homiller, PLLC

(57)　　ABSTRACT

A Near-Field Communication (NFC)-enabled constrained device (100) is provided. The constrained device (100) comprises a processing circuit (111) operative to implement a functionality of the constrained device (100), an NFC-interface circuit (115) configured to harvest power transmitted by an NFC-enabled control device (200) and to enable exchange of data with the control device (200), when the devices are in proximity, and a restart circuit (121) configured to accumulate electrical charge using the harvested power received from the NFC-interface circuit (115), and to trigger restart of the processing circuit (111) when the accumulated electrical charge exceeds a threshold level. Further provided is an NFC-enabled control device (200) for restarting the NFC-enabled constrained device (100). The control device (200) comprises an NFC-interface circuit (215) configured to transmit power to the constrained device (100) and to enable exchange of data with the constrained device (100), when the devices are in proximity, and a processing circuit (211) operative to initiate the transmission of power to the constrained device (100), and to control the exchange of data with the constrained device (100).

12 Claims, 2 Drawing Sheets

(51) Int. Cl.
    H04B 5/20     (2024.01)
    H04B 5/77     (2024.01)
    H04B 5/79     (2024.01)
    H04B 5/45     (2024.01)

(56)           References Cited

U.S. PATENT DOCUMENTS

| | | | |
|---|---|---|---|
| 9,600,991 B2 * | 3/2017 | Chen | H04B 5/0031 |
| 9,762,292 B2 * | 9/2017 | Manian | H04B 5/0037 |
| 10,396,858 B2 * | 8/2019 | Greene | H04B 5/0031 |
| 10,931,135 B2 * | 2/2021 | Lazaro | H02J 7/34 |
| 11,418,234 B2 * | 8/2022 | Greene | H04B 5/0068 |
| 2015/0194817 A1 | 7/2015 | Lee et al. | |

FOREIGN PATENT DOCUMENTS

| | | | |
|---|---|---|---|
| EP | 3451543 A1 | 3/2019 |
| WO | 2010029446 A1 | 3/2010 |
| WO | 2019052911 A1 | 3/2019 |

OTHER PUBLICATIONS

ECMA International, "Standard ECMA-352", Near Field Communication Interface and Protocol-2 (NFCIP-2), 1st Edition, Dec. 2003, pp. 1-8.

* cited by examiner

NFC-ENABLED CONSTRAINED DEVICE, NFC-ENABLED CONTROL DEVICE, AND METHOD THEREOF

TECHNICAL FIELD

The invention relates to a Near-Field Communication (NFC)-enabled constrained device, an NFC-enabled control device for restarting an NFC-enabled constrained device, a method of restarting an NFC-enabled constrained device, a corresponding computer program, and a corresponding computer program product.

BACKGROUND

Many types of Internet-of-Things (IoT) devices, such as sensors and actuators, are characterized by their small size and limited capabilities, especially with respect to their processing power and battery capacity. These types of devices are sometimes referred to as constrained devices (see, e.g., "Terminology for Constrained-Node Networks", Request for Comments (RFC) 7228, Internet Engineering Task Force (IETF), May 2014).

A common constraint of IoT devices and other types of constraint devices relates to limitations in user interfaces and accessibility during deployment and operation, e.g., for data exchange with the IoT device, configuration changes or software update of the IoT device, restart of the IoT device, and so forth. In order to reduce size and complexity, many IoT devices such as sensors are only equipped with an NFC interface for exchange of data, and do not comprise any keys, buttons, or other means which enable a human user to control the IoT device. In addition, such devices are often-times provided with integrated, non-removable batteries. As an example, sensor devices, such as blood glucose sensors which are worn on a person's skin or may even be implanted into a person's body, typically comprise a battery-powered processor operative to periodically read-out measured data from a sensor and store the measured data in a memory. The stored data can subsequently be read-out via the NFC interface by using an NFC control device, such as an NFC-enabled smartphone using a dedicated software application or app.

In addition to exchanging data with the sensor device, the control device can transmit power over the NFC interface, which power can be harvested by the sensor device, e.g., for use as power supply for the NFC-interface circuit of the sensor device or for charging the sensor's battery. In NFC terminology, this type of devices is referred to as a semi-passive tag operating in NFC reader/writer mode.

An inherent problem of constrained devices, in particular those which only comprise an NFC interface but no additional interface such as a buttons or keys, is the difficulty to restart, or reset, the device, if the device has become non-operational. This may, e.g., be the case if a processor implementing the device's functionality (such as periodically reading-out and storing sensor data for later read-out) by executing a software has become non-operational (i.e., has "crashed") due to a malfunction ("bug") of the software. Alternatively, if the processor comprises an Application-Specific Integrated Circuit (ASIC), a Field Programmable Gate Array (FPGA), a Complex Programmable Logic Device (CPLD), or similar type of circuit, a design-flaw in the processor's state machine may result in the processor reaching an inescapable state and the device accordingly becoming non-operational.

In situations when a constrained device has become non-operational, it may become unresponsive to restart or reset commands which are received via the device's NFC interface. Since no keys or buttons for triggering a restart or reset by manual user interaction are available, and the battery cannot be removed to force a cold reset, the constrained device may need to be replaced.

SUMMARY

It is an object of the invention to provide an improved alternative to the above techniques and prior art.

More specifically, it is an object of the invention to provide an improved solution for restarting NFC-enabled constrained devices.

These and other objects of the invention are achieved by means of different aspects of the invention, as defined by the independent claims. Embodiments of the invention are characterized by the dependent claims.

According to a first aspect of the invention, an NFC-enabled constrained device is provided. The constrained device comprises a processing circuit operative to implement a functionality of the constrained device, an NFC-interface circuit, and a restart circuit. The NFC-interface circuit is configured to harvest power transmitted by an NFC-enabled control device and to enable exchange of data with the control device, when the constrained device and the control device are in proximity. The restart circuit is configured to accumulate electrical charge using the harvested power received from the NFC-interface circuit, and to trigger restart of the processing circuit when the accumulated electrical charge exceeds a threshold level.

According to a second aspect of the invention, an NFC-enabled control device for restarting an NFC-enabled constrained device is provided. The control device comprises an NFC-interface circuit and a processing circuit. The NFC-interface circuit is configured to transmit power to the constrained device and to enable exchange of data with the constrained device, when the constrained device and the control device are in proximity. The processing circuit is operative to initiate the transmission of power via the NFC-interface circuit to the constrained device, and to control the exchange of data with the constrained device via the NFC-interface circuit.

According to a third aspect of the invention, a method of restarting an NFC-enabled constrained device is provided. The method is performed by an NFC-enabled control device comprising an NFC-interface circuit configured to transmit power to the constrained device and to enable exchange of data with the constrained device, when the constrained device and the control device are in proximity. The method comprises initiating the transmission of power via the NFC-interface circuit to the constrained device, and controlling the exchange of data with the constrained device via the NFC-interface circuit.

According to a fourth aspect of the invention, a computer program is provided. The computer program comprises computer-executable instructions for causing an NFC-enabled control device to perform the method according to an embodiment of the third aspect of the invention, when the computer-executable instructions are executed on one or more processors comprised in the control device.

According to a fifth aspect of the invention, a computer program product is provided. The computer program product comprises a computer-readable storage medium which has the computer program according to the fourth aspect of the invention embodied therein.

The invention makes use of an understanding that NFC-enabled constrained devices which have become non-operational may be restarted by utilizing the power which is transmitted from the NFC-enabled control device to the constrained device, where it is harvested, when the two devices are in proximity. Embodiments of the invention are advantageous in that the restart of the processor circuit comprised in the constrained device, which implements the functionality of the constrained device, is achieved by means of a relatively simple electronic circuit which does not rely on any data exchange with the control device, such as receiving a reset signal or request via the NFC interface, but on accumulating charge until a threshold level is exceeded.

Even though advantages of the invention have in some cases been described with reference to embodiments of the first and second aspects of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 3 illustrates another embodiment of the restart circuit, implementing different threshold voltage levels for separately triggering restart of a plurality of processing circuit modules comprised in the processing circuit.

FIG. 4 shows a method performed by the NFC-enabled control device, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
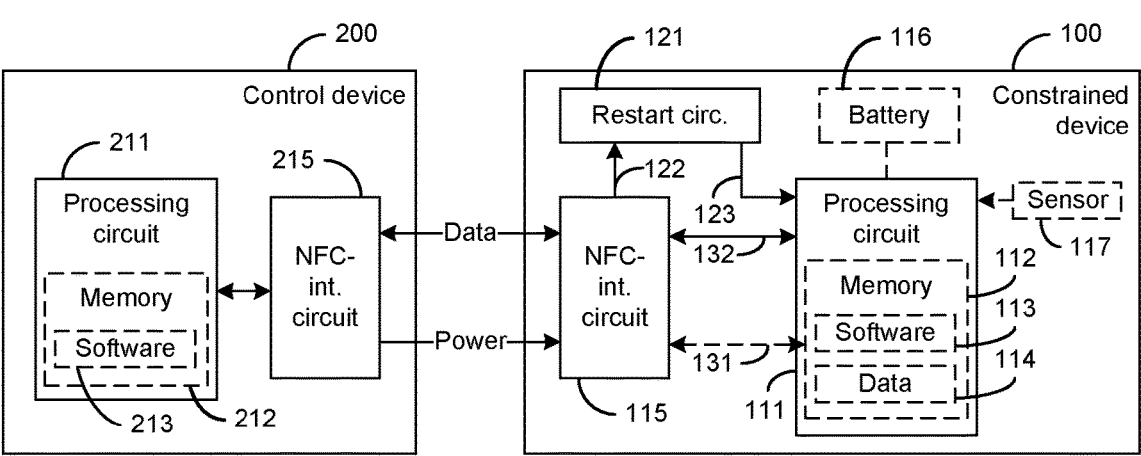
FIG. 1 schematically illustrates an NFC-enabled constrained device and an NFC-enabled control device, in accordance with embodiments of the invention.

In FIG. 1 a Near-Field Communication (NFC)-enabled constrained device 100 and an NFC-enabled control device 200 are illustrated, in accordance with embodiments of the invention.

In the present context, a constrained device is understood to be a computing device with comparatively limited capabilities in terms of processing power and battery capacity, and may also be limited with respect to the number and type(s) of interfaces for accessing, or interacting with, the constrained device, such as data/communication/network interfaces, keys, buttons, displays, haptic sensors and actuators, microphones, loudspeakers, and the like. Typical examples of this class of electronic devices are, e.g., IoT devices such as sensors and actuators. The solutions described herein address a problem which is inherent to constrained devices which comprise some type of processing circuit which implements a functionality provided by the constrained device, and an NFC interface for accessing the constrained device.

In NFC terminology, the NFC-enabled constrained device 100 may be referred to as an "NFC tag" operating in semi-passive mode. In semi-passive mode, also known as battery-assisted mode, such a device operates stand-alone to perform a certain functionally which is implemented by its battery-powered processing circuit. This functionality may, e.g., relate to applications which require autonomous and continuous monitoring, such as data loggers or medical sensors. An NFC-enabled constrained device may harvest power which is transmitted by an NFC-enabled control device, also known as "NFC reader/writer" in NFC terminology, which is brought into proximity of the NFC-enabled constrained device, within a distance of a few centimeters or shorter. The harvested power may be used to power the NFC-interface circuit of the NFC-enabled constrained device, effect data exchange with the control device, and/or charge the battery of the NFC-enabled constrained device.

Further with reference to FIG. 1, the NFC-enabled constrained device 100 comprises a processing circuit 111 which is operative to implement a functionality of the constrained device 100, and an NFC-interface circuit 115. The NFC-interface circuit 115 is configured to harvest power which is transmitted by the NFC-enabled control device 200 and to enable exchange of data with the control device 200. The transmission and harvesting of power, as well as the exchange of data, via the NFC air-interface can commence when the constrained device 100 and the control device 200 are brought into proximity, typically within a distance of a few centimeters or shorter. Exchange of data is to be understood to encompass transmission of data from the NFC-enabled control device 200 to the NFC-enabled constrained device 100, and/or vice versa, using any suitable communications protocol and data format, or a combination of suitable communications protocols and/or data formats.

The NFC-enabled constrained device 100 further comprises a restart circuit 121 which is configured to accumulate electrical charge using the harvested power received from the NFC-interface circuit 115 (via connection 122), and to trigger restart of the processing circuit 111 (via connection 123) when the electrical charge accumulated by the restart circuit 121 exceeds a threshold level. Throughout this disclosure, the terms "restart" and "reset" are used interchangeably.

As is illustrated in FIG. 1, the restart of the processing circuit 111 is triggered via connection 123 to a reset input which the processing circuit 111 is provided with. Most commercially available processing circuits are provided with a reset input which, when set to a defined voltage level such as low ("0") or high ("1"), initiates a reset of the processing circuit in a controlled manner.

The processing circuit 111 may comprise one or more processors, e.g., any type of general-purpose Central Processing Unit (CPU), microprocessor, System-on-Chip (SoC), Graphics Processing Unit (GPU), Digital Signal Processor (DSP), or the like, operative to execute computer-readable instructions 113, i.e., software, which are stored in a memory 112 comprised in the processing circuit 111, and which cause the processing circuit 111 to implement the functionality of the constrained device 100. In general, computing devices which provide functionality implemented by software which is executed by a one or more processors are prone to malfunction or design flaws of the software (aka "bugs") which may result in the computing device becoming non-operational (which is commonly referred to as a "crash" of the computing device). The memory 112 may, e.g., be a Random-Access Memory (RAM), a Read-Only Memory (ROM), a Flash memory, or the like.

Alternatively, the processing circuit 111 may comprise one or more of an ASIC, an FPGA, and a CPLD. In such circuits, a design-flaw in the processing circuit's state machine may result in the processing circuit reaching an inescapable state, and the device accordingly becoming non-operational.

The processing circuit 111 may be powered by a battery 116 which is comprised in the constrained device. Typically, due to size limitations of constrained devices, and to reduce complexity and manufacturing costs, the battery 116 is non-removable. Consequently, the constrained device cannot be restarted by removing or disconnecting the battery (aka "cold restart").

The constrained device 100 may optionally be configured to be accessible exclusively through data exchanged via the NFC-interface circuit 115. In such scenario, which is typical for constrained device, the constrained device does not have any other interface(s) for data exchange or interaction with a human user, such as keys or buttons for resetting the constrained device. This means that the constrained device 100 is accessible by transmitting data to the constrained device 100 via the NFC-interface circuit 115, such as requests or commands (e.g., a restart command), and/or receiving data from the constrained device 100 via the NFC-interface circuit 115, such as results of measurements performed by the constrained device 100 or any other data.

As an example, the constrained device 100 may further comprise a sensor 117, and the functionality of the constrained device 100 may comprise reading sensor data from the sensor 117, storing the sensor data 114 in a memory 112 comprised in the processing circuit 111 (or in a separate memory provided in the constrained device 100), and transmitting the sensor data 114 via the NFC-interface circuit 115 to the NFC-enabled control device 200. In practice, the acquired and stored sensor data 114 is transmitted by the constrained device 100 in response to receiving a request from the control device 200. Alternatively, the constrained device 100 may be operative to transmit the acquired sensor data 114 in response to detecting proximity of the control device 200. This may, e.g., be achieved by detecting that a voltage of the harvested power rises above a threshold level, after harvesting of power by the NFC-interface circuit 115 has commenced. As is illustrated in FIG. 1, the NFC-interface circuit 115 may be configured to directly retrieve the stored sensor data 114 from the memory 112 (via connection 131), or by operation of the processing circuit 111 (via connection 132).

For instance, the constrained device 100 may be a sensor device, e.g., a blood glucose sensor which is worn on a person's skin or may even be implanted into a person's body. Such sensors typically comprise a battery-powered processor which is operative to periodically read-out measured data from a blood-glucose sensor, and to store the measured data in a memory. The stored data can subsequently be read-out via NFC by an NFC-enabled control device, such as an NFC-enabled smartphone using a dedicated software application or app.

As an alternative, the constrained device 100 may further comprise an actuator (not shown in FIG. 1), and the functionality of the constrained device 100 may comprise receiving a request or command, e.g., a signal or message, via the NFC-interface circuit 115 from the control device 200, and activating the actuator in response to the received command. As an example, the constrained device 100 may be an NFC-enabled electronic door lock which can be unlocked by an NFC-enabled smartphone 200 using a dedicated software application or app. In such case, the command which is received via the NFC-interface circuit 115 may comprise credentials like a PIN code, a shared secret, a key, or a combination thereof.

The restart circuit 121 is configured to trigger restart of the processing circuit 111 after a duration of time, during which harvested power is received form the NFC-interface circuit 115, which is substantially longer than a duration of time required for exchanging data between the control device 200 and the constrained device 100 during normal operation. More specifically, this is achieved by a proper choice of the time constant of the electronic circuit accumulating the electrical charge which is received from the NFC-interface circuit 115, in the following referred to as charging circuit, in combination with a proper choice of the threshold level which, when exceeded, triggers restart of the processing circuit 111. The time constant and the threshold level are configured by design of the restart circuit 121.

As an example, if the duration of time which is required for exchanging data between the control device 200 and the constrained device 100 during normal operation is of the order of one second, or less, the time constant and the threshold level may be configured such that the duration of time during which harvested power is received form the NFC-interface circuit 115 is of the order of three to ten seconds. Selecting a duration of time during which harvested power is received form the NFC-interface circuit 115 which is substantially longer than a duration of time required for exchanging data between the control device 200 and the constrained device 100 during normal operation is advantageous in that unintentional restarts, which are triggered by maintaining proximity between the constrained device 100 and the control device 200 for too long time, may be avoided.

Figure 2:
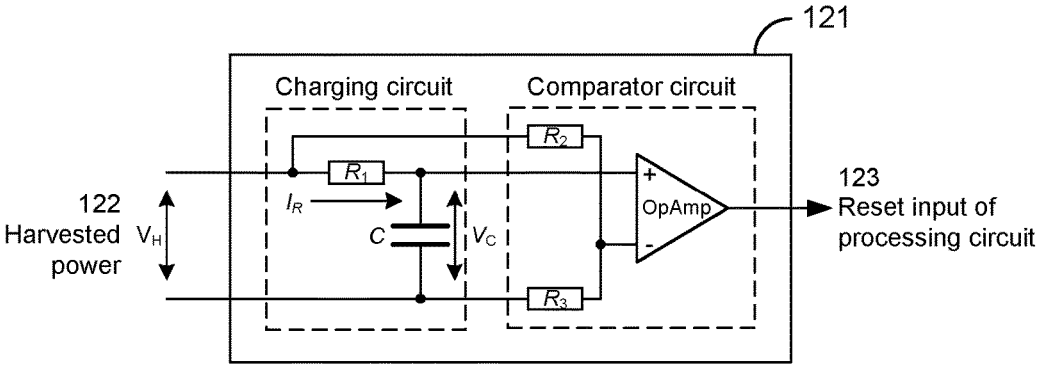
FIG. 2 illustrates an embodiment of the restart circuit, implementing a single threshold voltage level for triggering restart of the processing circuit.

An embodiment of the restart circuit 121 is illustrated in FIG. 2. The time constant of the charging circuit, i.e., the part of the restart circuit 121 which accumulates the electrical charge which is received from the NFC-interface circuit 115, can be configured by proper design of the charging circuit and its electrical components. The charging circuit may, e.g., be implemented as a resistor-capacitor (RC) circuit.

For instance, if the charging circuit is a conventional first-order RC circuit as illustrated in FIG. 2, comprising a resistor $R_1$ and a capacitor C, the voltage $V_C$ over the capacitor C increases with time as $$V_C = V_H (1 - e^{-t/(R_1 \cdot C)}) \tag{1},$$

where $V_H$ is the voltage of the harvested power received from the NFC-interface circuit 115 (via connection 122), and t is the time which has passed since the voltage $V_H$ has been applied to the restart circuit 121 (in practice, this is the time which has lapsed since harvesting of power by the NFC-interface circuit 115 has started and the voltage $V_H$ of the harvested power has reached stable value). The time constant of the first-order RC circuit is defined as $$\tau = R_1 \cdot C \qquad (2)$$

(with resistance R in $\Omega$ and capacitance C in Farads). A similar relation applies to the charge Q accumulated by the capacitor C, as $Q = V_C \cdot C$. Correspondingly, the charging current $I_R$ through the resistor $R_1$ decreases with time as $$I_R = \frac{V_H}{R_1} \cdot e^{-t/(R_1 \cdot C)}. \qquad (3)$$

In order to detect that the electrical charge accumulated by the restart circuit 121, in particular by the capacitor C, exceeds a threshold level, the restart circuit 121 may be configured to trigger restart of the processing circuit 111 when any one, or a combination of, the following conditions are fulfilled: the charge which is accumulated by the capacitor C rises above a threshold charge level, the voltage $V_C$ which builds up over the capacitor C rises above a threshold voltage level, and the charging current $I_R$ through the resistor $R_1$ falls below a threshold current level.

As an example, and with reference to FIG. 2, the restart circuit 121 may comprise a voltage comparator circuit which is configured to detect that the voltage $V_C$ which builds up over the capacitor rises above a threshold voltage level $V_{TH}$. Such a voltage comparator circuit may, e.g., comprise an operational amplifier ("OpAmp" in FIG. 2) which is arranged to compare the voltage $V_C$ over the capacitor C, which is applied to the non-inverting input of the operational amplifier ("+" in FIG. 2), to a reference voltage which is applied to the inverting input ("−" in FIG. 2) of the operational amplifier (for the sake of simplicity, the power supply inputs of the operational amplifier are omitted in FIGS. 2 and 3). The reference voltage is provided by means of a voltage divider made up of $R_2$ and $R_3$, and defines the threshold voltage level, $$V_{TH} = V_H \cdot \frac{R_2}{R_2 + R_3}. \qquad (4)$$

While the voltage over the capacitor, $V_C$, exceeds the threshold voltage level $V_{TH}$, the output of the operational amplifier assumes the higher level of the supply voltage of the operational amplifier (e.g., $V_H$, or a voltage of the battery 116, if the restart circuit 121 is powered by the battery 116), and while $V_C$ does not exceed $V_{TH}$ the output of the operational amplifier assumes the lower level of the supply voltage (e.g., 0 V). It will be appreciated that the resistor $R_2$ may alternatively be connected to the voltage provided by the battery 116, instead of the voltage $V_H$ as illustrated in FIG. 2, in which case Eq. (4) is modified accordingly.

In the following, configuration of the restart circuit 121 in accordance with embodiments of the invention is exemplified, for embodiments of the constrained device 100 with rely on a the restart circuit 121 which is configured as to trigger restart of the processing circuit 111 when the voltage $V_C$ which builds up over the capacitor C rises above the threshold voltage level $V_{TH}$. To this end, based on Eqs. (1) and (2), it is known that the voltage over the capacitor $V_C$ reaches a level of $0.63 \cdot V_H$ after a time t which is equal to the time constant $\tau$. In order to trigger restart of the processing circuit 111 when the voltage $V_C$ exceeds the threshold voltage level $V_{TH}$ of $0.63 \cdot V_H$, the resistors $R_2$ and $R_3$ which make up the voltage divider of the comparator circuit are dimensioned according to Eq. (4). More specifically, $R_2$ and $R_3$ are dimensioned such that $R_2/(R_2+R_3)$ equals 0.63. This may, e.g., be achieved by using $R_2$ equal to 3.7 k$\Omega$ and $R_3$ equal to 6.3 k$\Omega$. Further, in order to configure the first-order RC circuit illustrated in FIG. 2 with a time constant $\tau$ of a desired value, $R_1$ and C are dimensioned in accordance with Eq. (2). As an example, for a desired time constant $\tau$ of three seconds (3 s), the capacitor C may be dimensioned with 100 $\mu$F and the resistor $R_1$ with 30 k$\Omega$. It will be appreciated that the electronic components comprised in the restart circuit 121 may be dimensioned in a different manner than what is exemplified hereinbefore, based on Eqs. (1), (2), and (4). It will also be appreciated that embodiments of the constrained device 100 may alternatively rely on a restart circuit 121 comprising a comparator circuit which is configured to detect that the charge which is accumulated by the capacitor C rises above a threshold charge level, or that the charging current $I_R$ through the resistor $R_1$ falls below a threshold current level. As yet a further alternative, embodiments of the constrained device 100 may rely on a combination of comparator circuits of different types, wherein the restart circuit 121 is configured to trigger restart if any one, or more, of a plurality threshold level conditions are fulfilled.

Figures 3, 4:
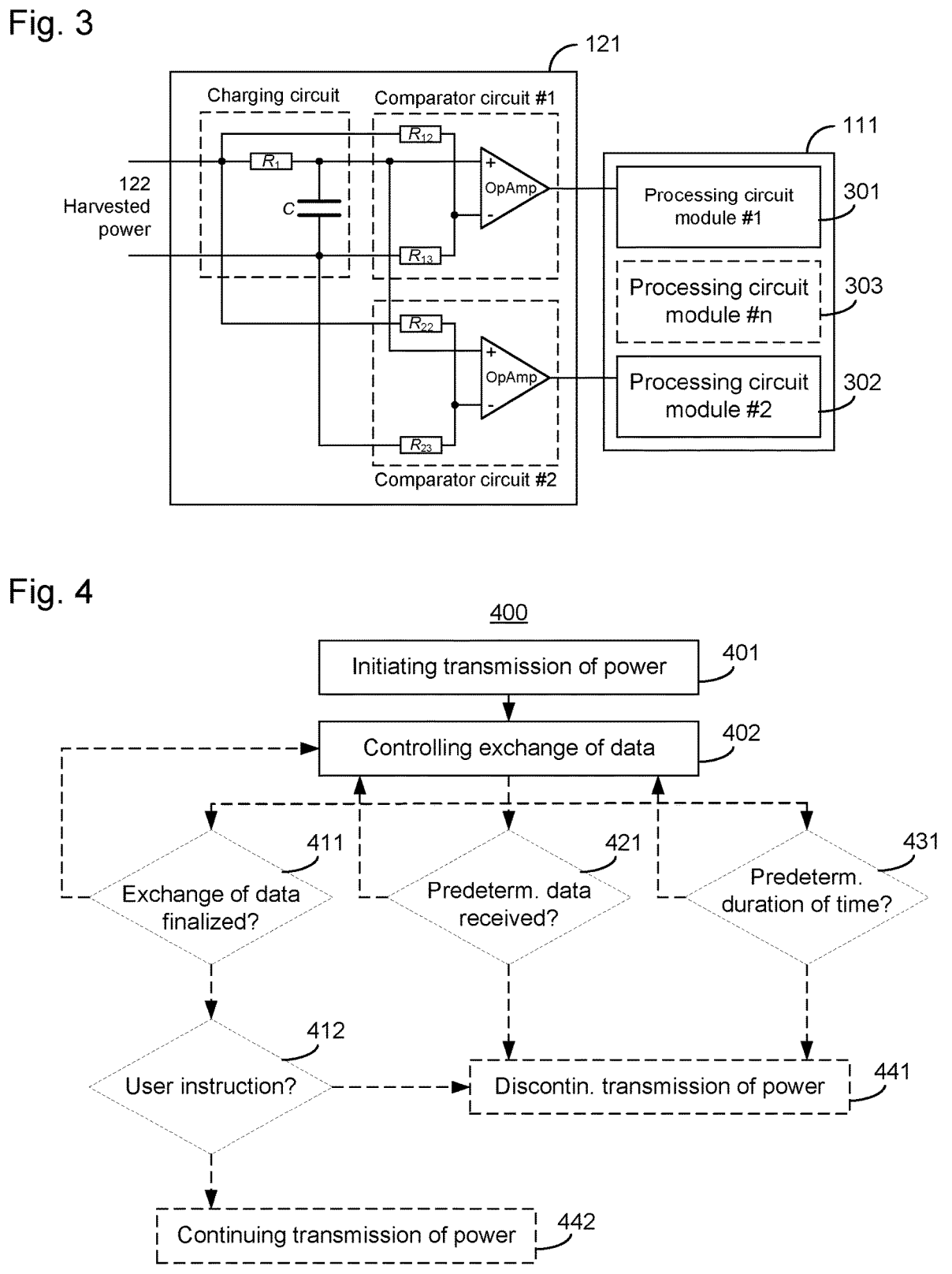

With reference to FIG. 3, the processing circuit 111 of the constrained device 100 may optionally comprise a plurality of processing circuit modules 301-303 (modules "#1", "#2", and "#n", in FIG. 3). In such embodiments of the constrained device 100, the restart circuit 121 may be configured to trigger restart of a first one of the plurality of processing circuit modules 301-303 when the electrical charge accumulated by restart circuit 121, in particular by the capacitor C comprised in the restart circuit 121, exceeds a first threshold level of a plurality of threshold levels. Further optionally, the restart circuit 121 may be configured to trigger restart of a second one of the plurality of processing circuit modules 301-303 when the accumulated electrical charge exceeds a second threshold level of the plurality of threshold levels, wherein the second threshold level is preferably different than the first threshold level. It will be appreciated that embodiments of the invention are not limited to comprising three processing circuit modules 301-303, and the restart circuit 121 being configured with two threshold levels, but may comprise any suitable number of processing circuit modules and may be configured with any suitable number of threshold levels for triggering restart of one or more corresponding processing circuit modules.

The restart circuit 121 being configured with a plurality of, preferably different, threshold levels is advantageous in that different parts of the constrained device 100, in particular different processing circuit modules 301-303 of the processing circuit 111, may be restarted separately, and optionally in accordance with a well-defined sequence which is determined by the time constant of the restart circuit 121 and the threshold levels of the restart circuit 121. For instance, and with reference to Eqs. (1), (2), and (4), for a given time constant $\tau$, the restart circuit 121 may be provided with different comparators circuits, as is illustrated in FIG. 3, wherein each comparator circuit is configured with a threshold level which is configured so as to trigger restart of a corresponding processing circuit module 301-303 after a desired duration of time. For instance, the resistors $R_{12}$ and $R_{13}$ comprised in the comparator circuit #1, and arranged to provide a reference voltage to the inverting input of the operational amplifier comprised in the comparator circuit #1, may be dimensioned to trigger restart of the processing circuit module #1 after a time which is equal to the time constant $\tau$ (e.g., 3 s), and the resistors $R_{22}$ and $R_{23}$ comprised in the comparator circuit #2, and arranged to provide a reference voltage to the inverting input of the operational amplifier comprised in the comparator circuit #2, may be dimensioned to trigger restart of the processing circuit module #2 after a time which is longer then the time constant $\tau$. As an example, according to Eq. (1), after a time t equal to $2\cdot\tau$, the voltage over the capacitor $V_C$ reaches a level of $0.87\cdot V_H$. With reference to the example described hereinbefore, the resistors $R_{12}$ and $R_{13}$ of the comparator circuit #1 may be dimensioned with the same values as $R_2$ and $R_3$ to trigger restart of the processing circuit module #1 after a time which is equal to the time constant $\tau$ (3 s), and the resistors $R_{22}$ and $R_{23}$ may, in accordance with Eq. (4), be dimensioned with 1.3 kΩ and 8.7 kΩ, respectively, to trigger restart of the processing circuit module #2 after a time t equal to $2\cdot\tau$ (6 s).

Embodiments of the constrained device 100 with a processing circuit 111 comprising a plurality of processing circuit modules 301-303 and a restart circuit 121 being configured with a plurality of threshold levels for separately triggering restart of a corresponding one of the processing circuit modules 301-303 is further advantageous in that they enable restart of only a subset of the processing circuit modules 301-303, by discontinuing the transmission of power from the control device 200 to the constrained device 100 after one or more of the plurality of processing circuit modules 301-303 have restarted. This may, e.g., be achieved by increasing a distance between the two devices 100 and 200, or by disabling transmission of power over the NFC air-interface by the control device 200, either by disabling the NFC-interface circuit 215 or the transmission of power by the NFC-interface circuit 215. In this way, and with reference to the example described hereinbefore, restart of a first one of the processing circuit modules 301-303, e.g., processing circuit module 301 (module #1), may be achieved after a time which is equal to the time constant $\tau$ (3 s), after which transmission of power over the NFC air-interface is discontinued. If transmission of power over the NFC air-interface continues after restart of the first processing circuit module 301 has been triggered, the second processing circuit module 302 (module #2) is triggered to restart after harvesting of power by the constrained device 100 has commenced for a duration of time which is equal to $2\cdot\tau$ (6 s).

As is illustrated in FIG. 3, the processing circuit 121 may comprise a combination of one or more processing circuit modules 301 and 302 which are configured to restart in response to receiving a restart signal via a dedicated reset input of the processing circuit 121, and one or more processing circuit modules (such as module #3) which are not configured to restart in response to receiving a restart signal via a dedicated reset input of the processing circuit 121.

The plurality of processing circuit modules 301-303 may, e.g., implement different parts of the functionality of the constrained device 100. As an example, a first one of the plurality of processing circuit modules 301-303 (e.g., module #1) may be operative to perform periodic measurements using the sensor 117, whereas a second one of the plurality of processing circuit modules 301-303 (e.g., module #2) is operative to store the sensor data 114, and optionally configuration settings which are used by the constrained device 100, in the memory 112 or any other memory provided in the constrained device 100. In such scenario, a user can advantageously first trigger restart of the first processing circuit module and subsequently, if restarting the first processing circuit module is not sufficient for restoring normal operation of the constrained device 100, trigger restart of the second processing circuit module.

It will further be appreciated that, as an alternative to utilizing a single charging circuit and a plurality of comparator circuits as is illustrated in FIG. 3, the processing circuit 121 may comprise a plurality of charging circuits which are configured with different time constants, which, in combination with a plurality of comparator circuits, are configured to separately trigger restart of one or more corresponding processing circuit modules.

Optionally, the NFC-interface circuit 115 of the constrained device 100 may further be configured to trigger restart of the processing circuit 111 when a voltage of the harvested power, $V_H$, rises above a threshold level after harvesting of power commences (in practice, this occurs after the constrained device 100 and the control device 200 have been brought into proximity). It will be appreciated that this threshold level is different from the threshold voltage level $V_{TH}$ discussed hereinbefore, and corresponds to a power-on-reset signal which is known from conventional NFC-interface circuits. Such power-on-reset signals are commonly used to signal that the voltage $V_H$ of the harvested power is sufficiently high to support an electronic circuit, such as the processing circuit 111 or any other electronic circuit comprised in the constrained device 100, and are typically triggered shortly after harvesting of power commences, typically within fractions of a second after the two devices 100 and 200 have been brought into proximity. In comparison, triggering restart of the processing circuit 111, or one or more of the processing circuit modules 301-302 comprised therein, is triggered after a duration of time which is substantially longer.

In the following, and with reference to FIG. 1, embodiments of the NFC-enabled control device 200 are described.

The NFC-enabled control device 200 comprises an NFC-interface circuit 215 which is configured to transmit power to an NFC-enabled constraint device 100, and to enable exchange of data with the constrained device 100, when the constrained device 100 and the control device 200 are in proximity. The control device 200 further comprises a processing circuit 211 which is operative to initiate the transmission of power via the NFC-interface circuit 215 to the constrained device 100, and to control the exchange of data with the constrained device 100 via the NFC-interface circuit 215. The transmission of power may, e.g., be initiated in response to detecting proximity of the two devices. Alternatively, the transmission of power may be initiated in response to a user instruction, e.g., the user pressing a button, providing a spoken instruction or gesture, or based on a configuration setting.

The processing circuit 211 may further be operative to discontinue the transmission of power to the constrained device 100 when the exchange of data with the constrained device 100 is finalized. In this case, the constrained device 100 is operational and data exchange between the control device 200 and the constrained device 100 commences as expected. The transmission of power is disabled in order to avoid an unintentional restart of the constrained device 100, which appears to be functioning and operational. However, the processing circuit 211 may optionally be further operative to continue the transmission of power to the constrained device 100 in response to a user instruction, after the exchange of data with the constrained device 100 is finalized. That is, although the constrained device 100 appears to be functional and operational, and data is exchanged as expected, a user of the control device may enforce a restart of the constrained device 100. This may, e.g., be the case if the data which is received from the constrained device 100, e.g., sensor data, appears unreliable or erroneous. The user instruction may, e.g., be the user pressing a button on the control device 200, providing a spoken instruction or gesture to the control device 200, or changing a configuration setting of the control device 200 or a software application or app which the control device 200 is provided with.

The processing circuit 211 may further be operative to discontinue the transmission of power to the constrained device 100 in response to receiving predetermined data from the constrained device 100. That is, the control device 200 stops transmitting power to the constrained device 100 in response to the receiving a predetermined signal from the constrained device 100, similar to an "keepalive" signal. Alternatively, the control device 200 may stop transmitting power to the constrained device 100 in response to receiving first data from the constrained device 100. This may, e.g., be the case if the constrained device 100 has become unresponsive due to a failure, and initiates communication, or responds to an attempt by the control device 200 to initiate communication, by transmitting data to the control device 200. If the processing circuit 111 of the constrained device 100 comprises a plurality of processing circuit modules 301-303, and the restart circuit 121 is configured to trigger restart of one or more of the plurality of processing circuit modules 301-303 when the accumulated electrical charge exceeds a corresponding threshold level of a plurality of threshold levels, the predetermined data may be indicative of which of the plurality of processing circuit modules 301-303 has successfully restarted, and the control device 200 may stop transmitting power to the constrained device 100 in response to receiving a signal or data which is indicative of that one or more processing circuit modules 301-303 have restarted, as desired.

The processing circuit 211 may further be operative to discontinue the transmission of power to the constrained device 100 when the transmission of power has commenced for a predetermined duration of time. The duration of time may, e.g., be configured by a user of the control device 200 or by a manufacturer of the constrained device 100. For instance, the predetermined duration of time may be longer than a duration of time required for exchanging data between the control device 200 and the constrained device 100 during normal operation, and shorter than a duration of time required for restarting the constrained device 100. In this way, a user of the control device 200 may use the control device 200 to perform routine tasks during normal operation, such as retrieving data from the constrained device 100, without the risk of inadvertently restarting the constrained device 100. As an example, if a typical interaction time is of the order of one second or less, and restart is triggered after an interaction time of about five or more seconds, the predetermined duration of time may be set to three seconds.

The NFC-enabled control device 200 may, e.g., be a smartphone, a mobile phone, a tablet, or a portable computer, which is optionally provided with a dedicated software application or app, or a dedicated control device. The software application or app may, e.g., be provided a by a manufacturer of the constrained device 100 so as to enable interaction with the constrained device 100 using a conventional user device such as a smartphone.

The processing circuit 211 of the control device 200 may comprise one or more processors, such as Central Processing Units (CPUs), microprocessors, application-specific processors, Graphics Processing Units (GPUs), and Digital Signal Processors (DSPs), or a combination thereof, and a memory 212 comprising a computer program 213 comprising instructions, i.e., a software application or app. The computer program 213 is configured, when executed by the processor(s) comprised in the processing circuit 211, to cause the NFC-enabled control device 200 to perform in accordance with embodiments of the invention described herein. The computer program 213 may be downloaded to the memory 212 by means of a wireless network interface (not shown in FIG. 1), as a data carrier signal carrying the computer program 213. The processor(s) may further comprise one or more ASICs, FPGAs, CPLDs, or the like, which in cooperation with, or as an alternative to, the computer program 213 are configured to cause the NFC-enabled control device 200 to perform in accordance with embodiments of the invention described herein.

In the following, embodiments of the method 400 of restarting an NFC-enabled constrained device 100 are described with reference to FIG. 4. The method 400 is performed by an NFC-enabled control device 200 which comprises an NFC-interface circuit 215 which is configured to transmit power to the constrained device 100 and to enable exchange of data with the constrained device 100, when the constrained device 100 and the control device 200 are in proximity.

The method 400 comprises initiating 401 the transmission of power via the NFC-interface circuit 215 to the constrained device 100, and controlling 402 the exchange of data with the constrained device 100 via the NFC-interface circuit 215.

The method 400 may further comprise discontinuing 441 the transmission of power to the constrained device 100 when the exchange of data with the constrained device 100 is finalized 411. Optionally, the transmission of power to the constrained device 100 may continue in response to a user instruction 412, after the exchange of data with the constrained device is finalized 411.

The method 400 may further comprise discontinuing 441 the transmission of power to the constrained device 100 in response to receiving 421 predetermined data from the constrained device 100.

The method 400 may further comprise discontinuing 441 the transmission of power to the constrained device 100 when the transmission of power has commenced for a predetermined duration of time 431. Preferably, the predetermined duration of time is longer than a duration of time required for exchanging data between the control device 200 and the constrained device 100 during normal operation, and shorter than a duration of time required for restarting the constrained device 100.

It will be appreciated that the method 400 may comprise additional, alternative, or modified, steps in accordance with what is described throughout this disclosure. An embodiment of the method 400 may be implemented as a computer program 213 comprising instructions which, when the computer program 213 is executed by one or more processors comprised in the processing circuit 211, cause the NFC-enabled control device 200 to carry out an embodiment of the method 400. The computer program 213 may be stored on a computer-readable storage medium 212, such as a memory stick, a RAM, a ROM, a Flash memory, a CDROM, a DVD, or the like. Alternatively, the computer program 213 may be carried by a data carrier signal, e.g., when the computer program is downloaded to the NFC-enabled control device 200 via a wireless network interface comprised in the NFC-enabled control device 200.

The person skilled in the art realizes that the invention by no means is limited to the embodiments described above. On the contrary, many modifications and variations are possible within the scope of the appended claims.

The invention claimed is:

1. A Near-Field Communication (NFC)-enabled constrained device comprising:
  a processing circuit operative to implement a functionality of the constrained device, the processing circuit comprising a plurality of processing circuit modules;
  an NFC-interface circuit configured to harvest power transmitted by an NFC-enabled control device and to enable exchange of data with the control device, when the constrained device and the control device are in proximity, and
  a restart circuit configured to accumulate electrical charge using the harvested power received from the NFC-interface circuit, and to trigger a reset of the processing circuit when the accumulated electrical charge exceeds a threshold level, the restart circuit being configured to trigger a reset of a first one of the plurality of processing circuit modules when the accumulated electrical charge exceeds a first threshold level of a plurality of threshold levels, the restart circuit being further configured to trigger react of a second one of the plurality of processing circuit modules when the accumulated electrical charge exceeds a second threshold level of the plurality of threshold levels.

2. The constrained device of claim 1, the restart circuit being configured to trigger the reset of the processing circuit after a duration of time, during which harvested power is received form the NFC-interface circuit, which is substantially longer than a duration of time required for exchanging data between the control device and the constrained device during normal operation.

3. The constrained device of claim 1, wherein the restart circuit comprises a resistor-capacitor circuit, and wherein the restart circuit is configured to trigger the reset of the processing circuit when any one, or a combination of, the following conditions are fulfilled: the charge which is accumulated by the capacitor rises above a threshold charge level, the voltage which builds up over the capacitor rises above a threshold voltage level, and the current through the resistor falls below a threshold current level.

4. The constrained device of claim 1, further comprising a sensor, the functionality of the constrained device comprising reading sensor data from the sensor, storing the sensor data in a memory comprised in the constrained device, and transmitting the sensor data via the NFC-interface circuit to the control device.

5. The constrained device of claim 1, further comprising an actuator, the functionality of the constrained device comprising receiving a command via the NFC-interface circuit from the control device, and activating the actuator in response to the received command.

6. The constrained device of claim 1, being configured to be accessible exclusively through data exchanged via the NFC-interface circuit.

7. The constrained device of claim 1, the NFC-interface circuit being further configured to trigger the reset of the processing circuit when a voltage of the harvested power rises above a threshold level after harvesting of power commences.

8. A Near-Field Communication (NFC)-enabled control device for restarting an NFC-enabled constrained device, the control device comprising:
  an NFC-interface circuit configured to transmit power to the constrained device and to enable exchange of data with the constrained device, when the constrained device and the control device are in proximity, and
  a processing circuit operative to:
    initiate the transmission of power via the NFC-interface circuit to the constrained device,
    control the exchange of data with the constrained device via the NFC-interface circuit, and
    perform at least one of the following:
      discontinuing the transmission of power to the constrained device in response to receiving predetermined data from the constrained device; and
      discontinuing the transmission of power to the constrained device when the transmission of power has commenced for a predetermined duration of time.

9. The control device of claim 8, wherein the predetermined duration of time is longer than a duration of time required for exchanging data between the control device and the constrained device during normal operation, and shorter than a duration of time required for restarting the constrained device.

10. A method of restarting a Near-Field Communication (NFC)-enabled constrained device, the method being performed by an NFC-enabled control device comprising an NFC-interface circuit configured to transmit power to the constrained device and to enable exchange of data with the constrained device, when the constrained device and the control device are in proximity, the method comprising:
  initiating the transmission of power via the NFC-interface circuit to the constrained device,
  controlling the exchange of data with the constrained device via the NFC-interface circuit, and
  at least one of the following:
    discontinuing the transmission of power to the constrained device in response to receiving predetermined data from the constrained device; and
    discontinuing the transmission of power to the constrained device when the transmission of power has commenced for a predetermined duration of time.

11. The method of claim 10, wherein the predetermined duration of time is longer than a duration of time required for exchanging data between the control device and the constrained device during normal operation, and shorter than a duration of time required for restarting the constrained device.

12. A non-transitory computer-readable medium comprising, stored thereupon, a computer program comprising computer-executable instructions for causing an NFC-enabled control device to perform the method of claim 11, when the computer-executable instructions are executed on one or more processors comprised in the control device.

* * * * *